United States Patent [19]

Bertling et al.

[11] Patent Number: 5,584,573
[45] Date of Patent: Dec. 17, 1996

[54] METHOD OF PRODUCING HEADLIGHT FOR VEHICLE AND HEADLIGHT PRODUCED THEREBY

[75] Inventors: Johannes-Gerhard Bertling, Vaihingen/Enz; Henning Hogrefe, Reutlingen; Rainer Neumann, Stuttgart, all of Germany

[73] Assignee: Robert Bosch GmbH, Stuttgart, Germany

[21] Appl. No.: 298,205

[22] Filed: Aug. 29, 1994

Related U.S. Application Data

[63] Continuation-in-part of Ser. No. 25,055, Mar. 2, 1993.

[30] Foreign Application Priority Data

Mar. 2, 1992 [DE] Germany .......................... 42 06 492.9
Dec. 3, 1992 [DE] Germany .......................... 42 40 594.7

[51] Int. Cl.$^6$ .................................................. B60Q 1/04
[52] U.S. Cl. .......................... 362/350; 362/341; 362/61
[58] Field of Search .................................. 362/347, 350, 362/61, 80, 296, 341

[56] References Cited

U.S. PATENT DOCUMENTS 4,803,601  2/1989  Collot et al. ................. 362/80

5,003,435  3/1991  Nakata .

FOREIGN PATENT DOCUMENTS 466605   1/1992  European Pat. Off. .
1497308  6/1969  Germany .

*Primary Examiner*—Leonard E. Heyman
*Attorney, Agent, or Firm*—Michael J. Striker

[57] ABSTRACT

A headlight for motor vehicles is produced so that it has a light source emitting light rays, a reflector which forms by reflection from the light rays emitted by the light source a light beam which is dispersed in horizontal planes and extends substantially parallel in vertical planes. The reflector has an optical axis, the light source is arranged so that its longitudinal axis extends parallel to the optical axis of the reflector. The reflector has an apex region which is formed so that the light emitted from the light source is reflected by the apex region as light rays converging in horizontal longitudinal planes which produce great images of the light source in lateral edge regions of a measuring screen arranged in front of the reflector. The reflector has regions which are located outside the apex region and reflect the light emitted by the light source with increasing distance from the optical axis as light rays which in horizontal longitudinal planes increasingly less strongly converge and produce smaller images of the light source on the measuring screen which form a horizontal light band. All the images of the light source are arranged underneath a bright/dark limit.

8 Claims, 3 Drawing Sheets

METHOD OF PRODUCING HEADLIGHT FOR VEHICLE AND HEADLIGHT PRODUCED THEREBY

CROSS-REFERENCE TO RELATED APPLICATION

This application is a continuation-in-part of application Ser. No. 025,055, filed on Mar. 2, 1993 now abandoned.

BACKGROUND OF THE INVENTION

The present invention relates to a method of producing a headlight for vehicles, and to a headlight produced thereby.

As disclosed in the German reference DE-AS 1,497,308, a headlight can have a reflector which is formed so that in its axial longitudinal section its intersecting curve is a hyperbola while in its vertical longitudinal section its intersecting curve is a parabola. A light source is arranged in the reflector and has a longitudinal axis extending transverse to the optical axis of the reflector. The reflector reflects the light rays emitted by the light source in form of a light beam in horizontal longitudinal planes diverging dispersed due to the characteristic of the hyperbola in form of a parallel light beam in vertical longitudinal planes due to the characteristic of the parabola. Since the hyperbola has a small curvature with predetermined sizes of the width and the height of the reflector light rays in the horizontal direction emitted from the light source in a horizontal direction can cover only a spatial angle. Therefore with such a reflector the light emitted by the light source is not well used. Moreover, this reflector reflects widely dispersed light beam in horizontal planes which has a reducing vertical extension to the sides. This light beam produced by the known reflector cannot illuminate or illuminate only poorly the lateral edge regions of a roadway in front of the vehicle. This makes more difficult for the vehicle driver to recognize the roadway course and the objects located at the edges of the roadway. The vehicle driving is especially difficult in fog or poor visibility.

SUMMARY OF THE INVENTION

Accordingly, it is an object of the present invention to provide a method of producing a headlight for vehicles and a headlight produced thereby, which avoid the disadvantages of the prior art.

In keeping with these objects and with others which will become apparent hereinafter, one feature of the present invention resides, briefly stated, in a method of producing a headlight for vehicle, which includes the steps of providing a light source emitting light rays, and producing a reflector which forms by reflection from the light rays emitted by the light source a light beam which is dispersed in horizontal planes and extends substantially parallel in vertical planes, arranging the light source so that its longitudinal axis extends parallel to the optical axis of the reflector, forming in the reflector an apex region which is formed so that the light emitted from the light source is reflected by the apex region as light rays converging in horizontal longitudinal planes which produce great images of the light source in lateral edge regions of a measuring screen arranged in front of the reflector; providing in the reflector regions which are located outside the apex region and reflect the light emitted by the light source with increasing distance from the optical axis as light rays which in horizontal longitudinal planes increasingly less strongly converge and produce smaller images of the light source on the measuring screen which form a horizontal light band and forming the regions of the reflector so that all the images of the light source reflected by the regions of the reflector are arranged underneath a bright/dark limit on the measuring screen.

Another feature of the present invention is a headlight produced by said method.

When the headlight is produced in accordance with the present invention, the light emitted by the light source due to a reflector a greater spatial angle and therefore the required high light intensity can be obtained with small dimensions of the reflector. Moreover due to the new design of the reflector light intense images of the light body are reflected in the lateral edge regions of the measuring screen which represents the roadway in front of the vehicle. Therefore the roadway edges are also greatly illuminated in the close region, whereby the recognition of the roadway course and objects at the roadway edges is substantially improved.

In accordance with another feature of the present invention, the reflector is formed so that the edge regions of the reflector collect the light emitted by the light source as rays which are substantially parallel in horizontal longitudinal planes or which are diverging in the horizontal longitudinal plane.

Still another feature of the present invention is that the apex region of the reflector is formed so that with increasing distance from the optical axis the light emitted by the light source is reflected in light rays which increasingly strongly converge in horizontal longitudinal planes. The light rays reflected from the apex region of the reflector can first strongly increase and then strongly reduce or remain constant, starting from the optical axis.

All images of the light source can be limited at the light/dark limit. The light/dark limit can be arranged horizontally.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
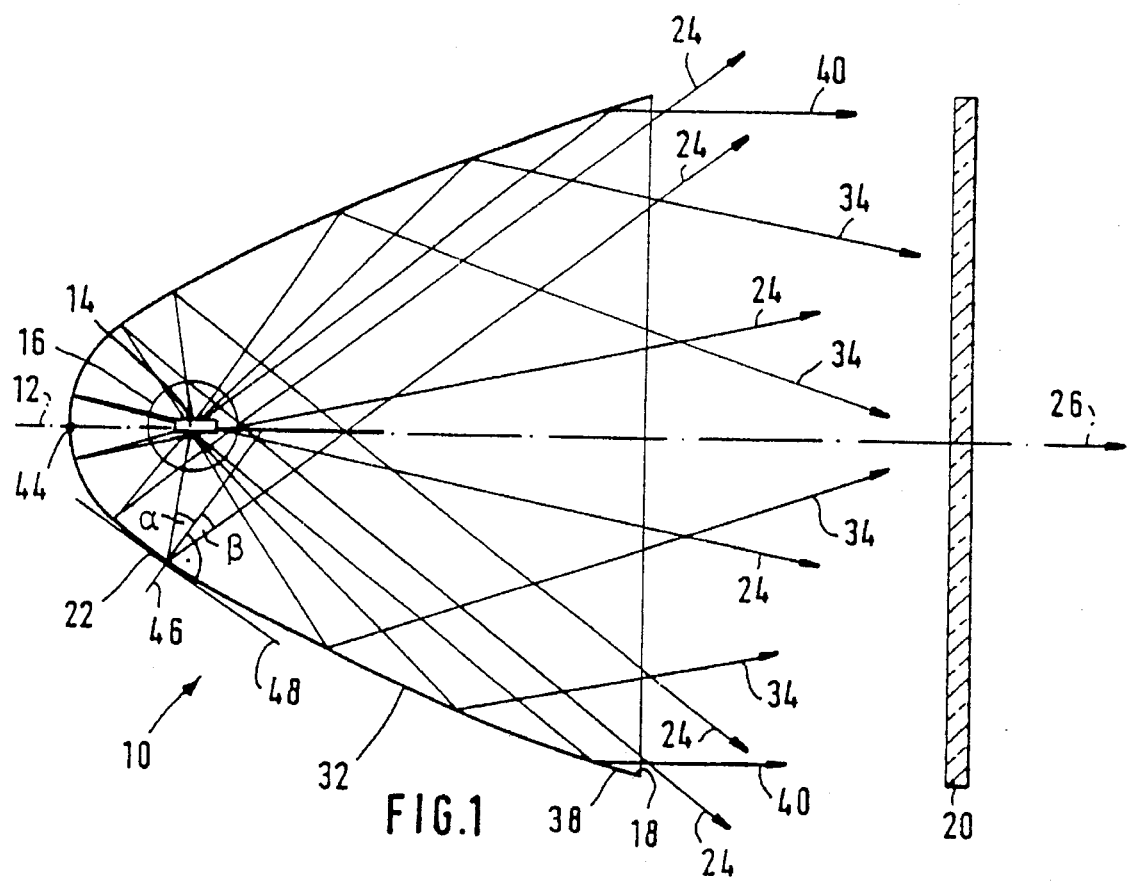
FIG. 1 is a view showing a horizontal central section of a headlight produced in accordance with a first embodiment of the invention.
Figure 2:
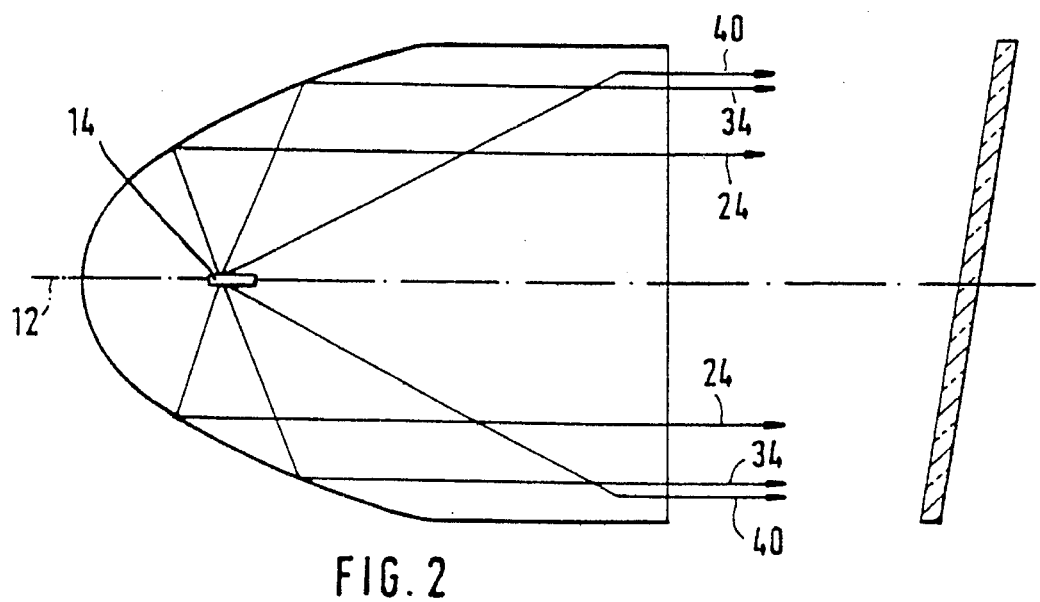
FIG. 2 is a view showing a vertical central section of the inventive headlight of FIG. 1.

FIGS. 1 and 2 shows a headlight formed in accordance with a first embodiment of the invention. The headlight has a reflector 10 which can be composed of synthetic plastic material or metal and can be arranged in a not shown housing. The reflector 10 is formed as a curved hollow body.

A lamp 14 of a light source 16 is arranged on the optical axis 12 of the reflector. The light source 16 can be formed as an incandescent lamp with an incandescent coil forming the light body 14. It can be also formed as a gas discharge lamp, in which the light body 14 is its light arc. The light body 14 is arranged so that its longitudinal axis extends substantially parallel to the optical axis 12. The light outlet opening 18 of the reflector 10 can be covered with a light disc 20. The light disc 20 can be formed as a clear disc without optically active elements or as a dispersion disc with optically active elements for influencing the light rays reflected by the reflector 12.

Figure 3:
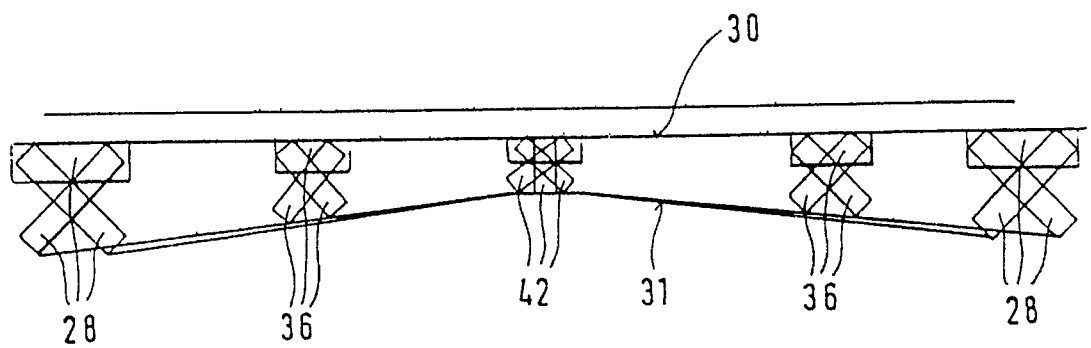
FIG. 3 is a view showing a light source reflected on a measuring screen in the headlight of FIGS. 1 and 2.

The apex region 22 of the reflector 12 is formed so that it reflects the images of the lamp 14 in a converging light beam in horizontal longitudinal planes as shown in FIG. 1 and in a substantially parallel light beam in vertical longitudinal planes as shown in FIG. 2. In the vertical longitudinal planes the rays 24 of the light beam extend substantially parallel to one another and horizontal or slightly downwardly inclined in the light direction 26. The convergence of the light rays 24 increases starting from the optical axis 12 substantially, so that the light beams 24 with increasing distance of the reflector part which reflects them from the optical axis 12 are inclined increasingly more to the optical axis 12, intersect the optical axis and illuminate a measuring screen shown in FIG. 3 farther in its lateral edge region. The light rays 24 which are reflected by the reflector part located at the right side of the optical axis 12 in FIG. 1, illuminate the measuring screen at the left side of the optical axis 12 and vice versa. The great images 28 of the lamp 14 are reflected by the apex region 22 due to its proximity to the lamp 14 in FIG. 3 and are arranged with their upper edges along a horizontal light/dark limit 30. The images 28 of the lamp 14 which are reflected by the central part of the apex region 22 located in the region of the optical axis 12 are arranged near the center of the measuring screen. However, the images 28 reflected by the parts of the apex region 22 arranged at a distance from the optical axis 12 are arranged due to the above described strongly increasing convergence of the light rays, in the lateral edge regions of the measuring screen. In FIG. 3 only individual images 28 are shown as an example.

The reflector 10 is formed in the regions 32 which laterally adjoin the apex region 22 so that they reflect the light rays 34 with increasing distance from the optical axis 12 in horizontal longitudinal plane so that they less strongly converge. In the vertical longitudinal planes they extend substantially parallel to one another as the light rays 24 of the apex region 22, and in the horizontal or light direction 26 they are slightly downwardly inclined. The inclination of the light rays 34 to the optical axis 12 reduces with increasing distance of this reflector part from the optical axis 12. The images 36 of the lamp 14 which are reflected by the central region 32 with increasing distance from the optical axis 12 (some of them shown in FIG. 3) travel from the edge of the measuring screen to its center and are increasingly smaller. The images 36 reflected by the central region 32 form on the measuring screen a horizontal light band which extends between the edge regions and the center of the measuring screen and are arranged under the light/dark limit 30.

The reflector 10 is formed in lateral edge regions 38 so that the light rays are reflected both in horizontal and vertical longitudinal planes substantially parallel to one another. Thereby small images 42 of the lamp 14 are reflected from the edge region 38 in the center of the measuring screen. These images 42, for obtaining higher illumination intensity, can be used underneath the light/dark limit 30 in the region of the optical axis 12 or in other words in the central region of the measuring screen.

A cutting plane which contains the optical axis 26 can be extended through each of the reflector regions which reflects the images 28, 36, 42. Depending on the position of the respective reflector region, the associated cutting plane has a predetermined inclination relative to the horizontal central plane. The inclination of the cutting plane through a reflector region located in the horizontal central plane is zero. In other words, it constitutes a horizontal central plane itself. For a reflector region located in a vertical central plane, the inclination of the associated cutting plane is 90 degree relative to the horizontal central plane. The inclination of the images 28, 36, 42 reflected by each reflector region with respect to the horizontal plane on the measuring screen, corresponds to the inclination of the corresponding cutting plane with respect to the horizontal central plane. Thus, the horizontally located images of the lamp 14 are reflected by the reflector regions located in the horizontal central plane and the vertically arranged images are reflected by the reflector regions located in the vertical central plane. All intermediate positions of the images of the lamp 14 are located between these extreme positions, or in other words the inclination is between 0 and 90 degree.

The transition between the apex region 22, the central region 32 and the edge region 38 of the reflector is continuous or in other words stepless without a band. Therefore a simple manufacture of the reflector 10 is possible. Moreover, it is thereby insured that no disturbances of the light beam reflected by the reflector 10 occur due to unevenness of the reflector shape. With the above described reflector 10 the light emitted both vertically and horizontally by the lamp 14 covers a great spacious angle and is used for illumination. The above described design of the reflector 10 is especially advantageous when it is used as a fog reflector for motor vehicles. In this case the greater images 28 of the lamp 14 reflected by the apex region 22 form a light band of greater vertical extension but relatively smaller illumination intensity. The smaller images 36 of the lamp 14 reflected by the central region 32 form a horizontal light band which is arranged closely under the light/dark limit 30 and has a smaller vertical extension than the light band reflected by the apex region 22. The smaller images 42 of the lamp 14 are reflected by the edge region 38 in the central region of the measuring screen and therefore enable a greater illumination intensity closely under the light/dark limit. The measuring screen is illuminated by all images 28, 36, 42 of the lamp 14 in a region which is limited upwardly by the light/dark limit 30 and limited downwardly by a limiting line 31 formed as an inverted U. This lower limiting line 31 is formed in that the vertical extension of the images of the lamp 14 reflected by the apex region 22 and illuminating the edge region of the measuring screen is greater than the images of the lamp 14 reflected by the central region 32 and the edge region 38.

The measuring screen represents a roadway located in front of a motor vehicle and illuminated by a light beam emitted from the headlight. The above described illumination of the measuring screen can be transmitted to the illumination of the roadway. Due to the great vertical extension of the images 28 of the lamp 14, the roadway edges are also illuminated in the close regions, while the center of the roadway is not illuminated or illuminated only poorly. Due to the illumination of the roadway edges in the close region they can be easily recognized by the driver, which is especially advantageous in fog or with generally poor visibility. An illumination also of the roadway center in the close region improves the visibility for the driver.

Figure 4:
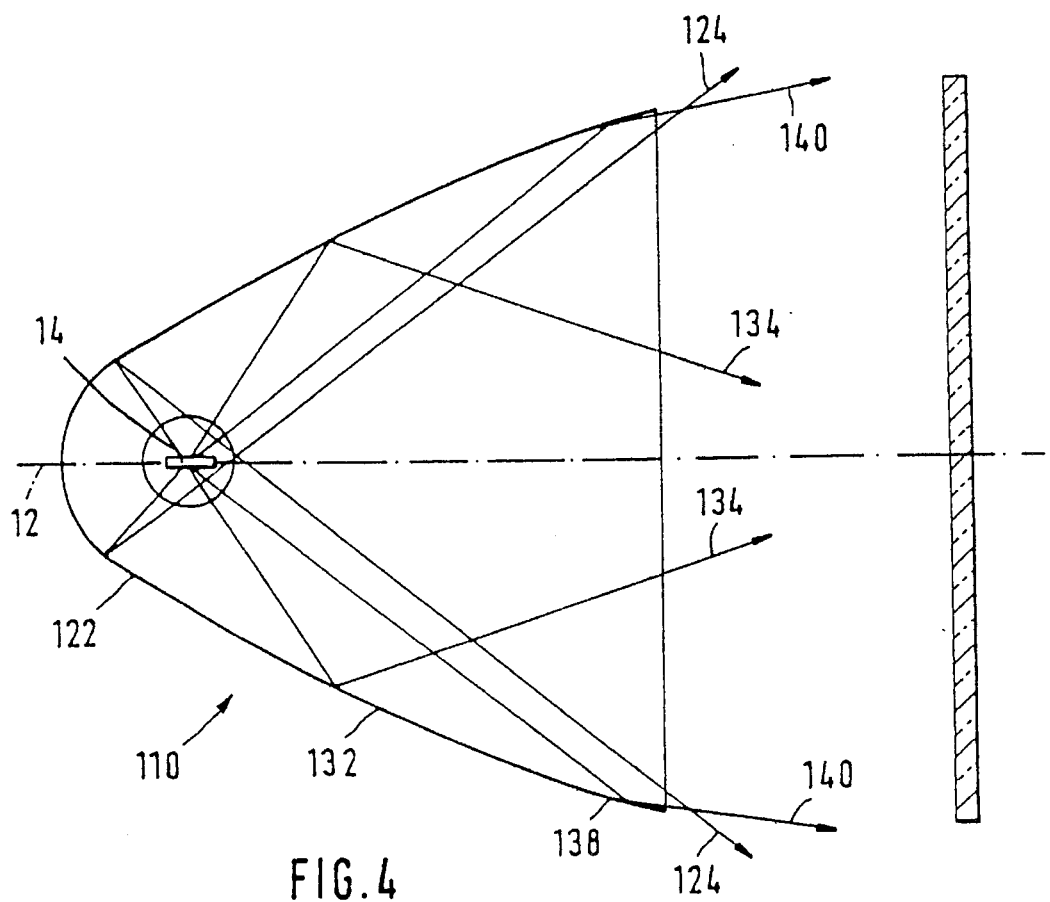
FIG. 4 is a view showing a horizontal central section of a headlight in accordance with a second embodiment of the invention.

In the headlight in accordance with the second embodiment shown in FIG. 4, the apex region 122 and the central region 132 of the reflector 110 are identical to the region described with respect to the first embodiment. The edge region 138 of the reflector 110 is formed so that the light rays 140 are reflected by it by diverging in horizontal longitudinal plane and reflected substantially parallel to one another in vertical longitudinal plane. This design of the reflector 110, in contrast to the design of the first embodiment provides for a homogeneous and especially intense illumination in the region of the optical axis 12. The transitions between the apex region 122, the central region 132 and the edge region 138 are continuous in the reflector 110, similarly to the reflector of the first embodiment.

With the design of the reflector 10 or 110, first for the light beam which must be reflected by the reflector 10, 110 a desired light distribution on the measuring screen is produced. The light distribution provides the required light intensity in the different regions of the measuring screen. The light intensity values are determined by the images of the lamp 14 reflected by the respective regions of the measuring screen. Starting from the images of the lamp 14 required for obtaining the predetermined light intensity values in the different regions of the measuring screen, the required reflector shape can be determined via reflection law. In the beginning of the calculation of the reflector shape, the distance of the apex point 44 of the reflector 10, 110 located on the optical axis 12 from the lamp 14 is provided. Starting from the apex point the reflector shape is calculated in steps. For each region of the reflector 10, angle of incidence α of the light rays emitted by the lamp 14 with respect to the normals 46 to the corresponding reflector region is equal to angle of reflection β which determines the orientation of the normals 46 for the corresponding reflector region, is determined from the position of the image of the lamp 14 to be reflected by this region via geometric reflection law. From the orientation of the normals 46 the tangential plane 48 extending perpendicular to it at the corresponding reflector point and thereby its orientation is determined. The sequential row of the reflector points determined one after the other provides a continuous reflector shape without steps or bands.

Figure 5:
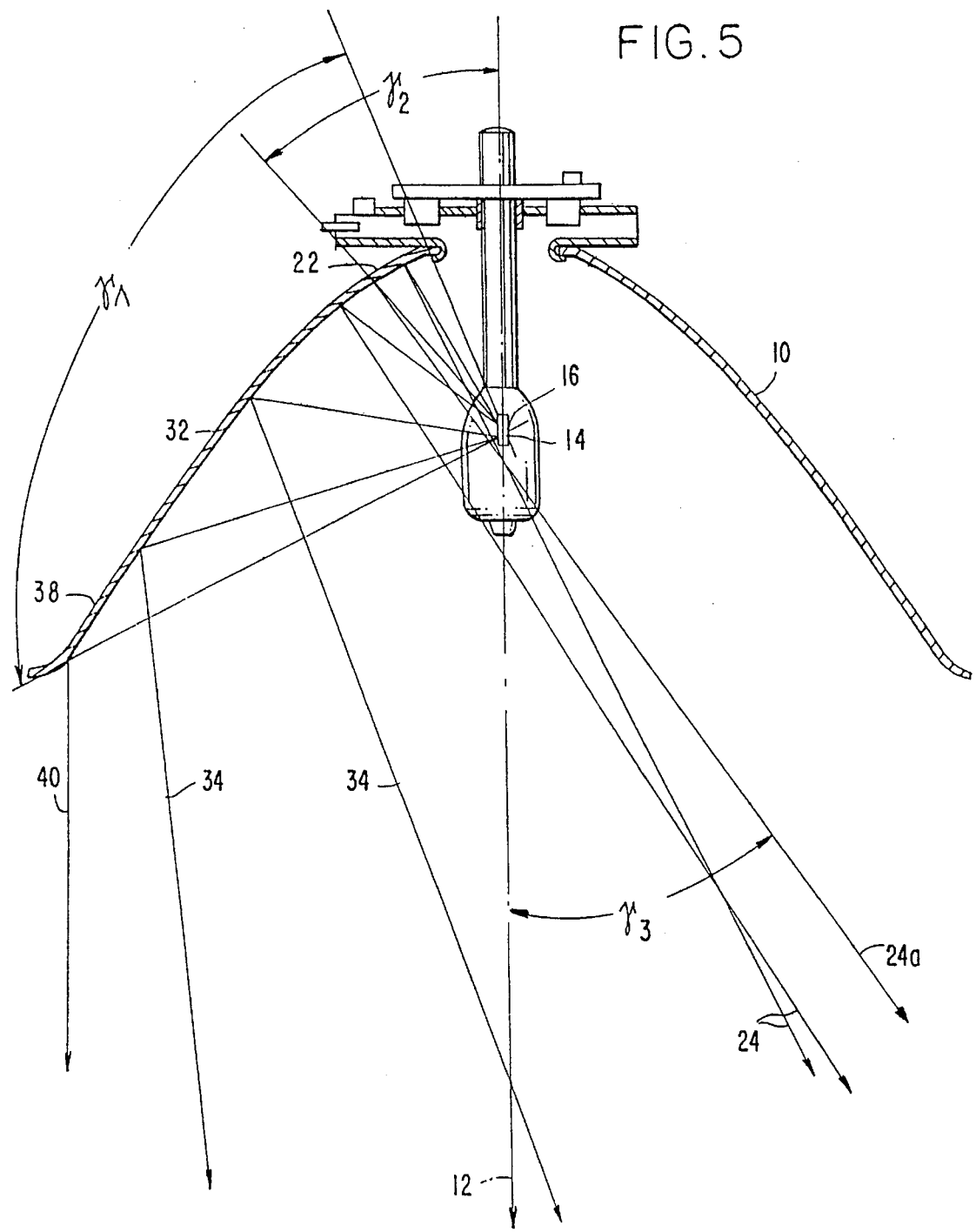
FIG. 5 is a view showing an example of a reflector in accordance with the present invention.

FIG. 5 shows an example of the reflector 10 on an enlarged scale in a horizontal, longitudinal central section. The light source formed as an incandescent lamp 16 with the light body formed as an incandescent coil 14 extending along its optical axis 12 is arranged in the reflector 10. The reflector 10 extends starting from an opening through the incandescent lamp 16 to the light outlet opening 18 and surrounds the incandescent coil 14 over an angle γ, of substantially 100 degree. The apex region 22 of the reflector 10 through which in accordance with the present invention the light rays 30 form are reflected with great conversions, extends at an angle γ₂ at substantially 40 degree. The angle γ₂ is the angle between the optical axis 12 and a straight line extending from the center of the incandescent coil 14 to the reflector 10. The light rays 24a which is reflected from the apex region 22 and having the strongest convergence, forms with the optical axis 12 an angle γ₃ of substantially 35 degree. The light ray 40 reflected from the outer edge 38 of the reflector 10 extends divergingly and forms with the optical 12 an angle of substantially 0.5 degree. The angle at which the light ray is reflected from the region 32 located between the apex region 22 and the edge region 38, is inclined to the optical axis 12. It decreases from the edge region 38 and reverses from converging to diverging. The reflector 10 has in the region of its light outlet opening 18 a width b of substantially 100 mm.

With the above presented information it is believed to be clear that a reflector can be made by using the measuring screen so that when corresponding images are produced on the measuring screen in accordance with the present invention, the reflector assumes its shape in accordance with the present invention. When at least one reflected is made in this way, its specific geometrical parameters can be measured, and then the reflector can be produced in a mass production.

It will be understood that each of the elements described above, or two or more together, may also find a useful application in other types of methods and constructions differing from the types described above.

While the invention has been illustrated and described as embodied in a method of producing a headlight for motor vehicles and headlight produced thereby, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing a headlight for motor vehicles, comprising the steps of providing a light source emitting light rays; and producing a reflector which, when an optical axis of said reflector is oriented in a horizontal direction, forms by reflection from the light rays emitted by the light source a light beam which is dispersed in horizontal planes and extends substantially parallel in vertical planes; arranging the light source so that its longitudinal axis extends parallel to the optical axis of the reflector; said producing including forming in the reflector an apex region which is formed so that the light emitted from the light source is reflected by the apex region as light rays converging in horizontal longitudinal planes which produce great images of the light source in lateral edge regions of a measuring screen arranged in front of the reflector; providing in the reflector regions which are located outside the apex region and reflect the light emitted by the light source with increasing distance from the optical axis as light rays which in horizontal longitudinal planes increasingly less strongly converge and produce smaller images of the light source on the measuring screen which form a horizontal light band; and forming the regions of the reflector so that all the images of the light source reflected by the regions of the reflector are arranged underneath a horizontal light/dark limit on the measuring screen so as to meet said horizontal light/dark limit and illuminate the measuring screen in a region which is limited downwardly by a limiting line formed as an inverted U.

2. A method as defined in claim 1; and further comprising the step of forming in the reflector edge regions which reflect the light emitted by said light source as substantially parallel light rays in horizontal longitudinal planes.

3. A method as defined in claim 1; and further comprising the step of forming in the reflector edge regions which reflect the light emitted by said light source as diverging light rays in horizontal longitudinal planes.

4. A method as defined in claim 1; and further comprising the step of forming the apex region of said reflector so that the light emitted by said light source with increasing distance from said optical axis is reflected by said apex region as light rays which increasingly strongly converge in horizontal longitudinal planes.

5. A method as defined in claim 4; and further comprising the step of forming the apex region so that the convergence of the light rays reflected by said apex region starting from said optical axis is first strongly increased and then less strongly increased.

6. A method as defined in claim 4; and further comprising the step of forming the apex region so that the convergence of the light rays reflected by said apex region starting from said optical axis is first strongly increased and then remains constant.

7. A method as defined in claim 1; and further comprising the step of forming the reflector so that all said images of said light source adjoin the light/dark limit.

8. A headlight for motor vehicles produced by a method which includes the steps of providing a light source emitting light rays; producing a reflector which, when an optical axis of said reflector is oriented in a horizontal direction, forms by reflection from the light rays emitted by the light source a light beam which is dispersed in horizontal planes and extends substantially parallel in vertical planes; arranging the light source so that its longitudinal axis extends parallel to the optical axis of the reflector, wherein said producing includes forming in the reflector an apex region which is formed so that the light emitted from the light source is reflected by the apex region as light rays converging in horizontal longitudinal planes which produce great images of the light source in lateral edge regions of a measuring screen arranged in front of the reflector, providing in the reflector regions which are located outside the apex region and reflect the light emitted by the light source with increasing distance from the optical axis as light rays which in horizontal longitudinal planes increasingly less strongly converge and produce smaller images of the light source on the measuring screen which form a horizontal light band, and forming the regions of the reflector so that all the images of the light source reflected by the regions of the reflector are arranged underneath a horizontal light/dark limit on the measuring screen so as to meet said horizontal light/dark limit and illuminate the measuring screen in a region which is limited downwardly by a limiting line formed as an inverted U.

* * * * *